Dec. 8, 1925.
W. A. CARNS
RESILIENT WHEEL
Filed Jan. 19, 1925

1,564,754

2 Sheets-Sheet 1

Inventor:
W. A. CARNS,
By Monroe E. Miller
Attorney.

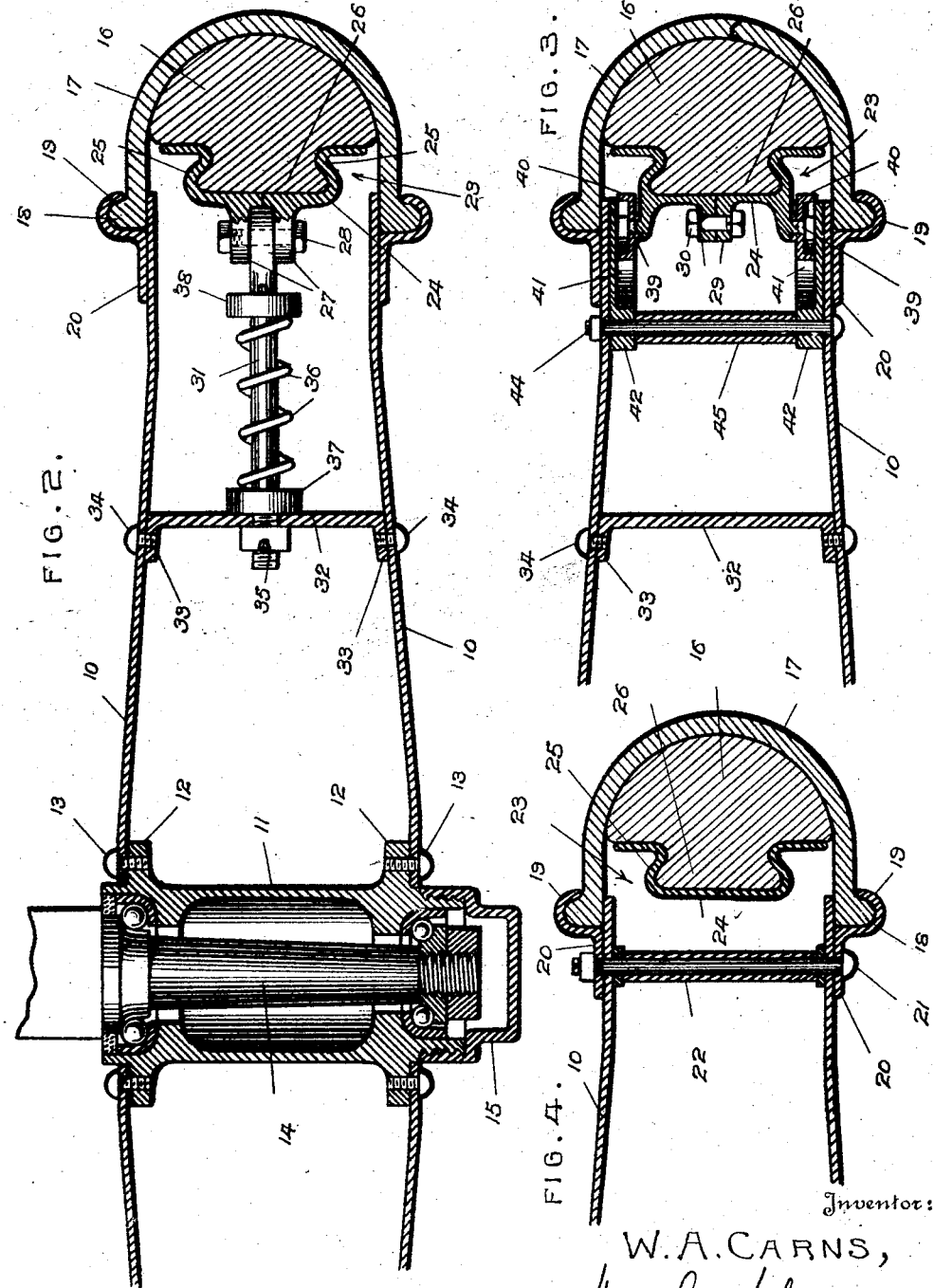

Patented Dec. 8, 1925.

1,564,754

UNITED STATES PATENT OFFICE.

WILLIAM ALVA CARNS, OF DUNN CENTER, NORTH DAKOTA.

RESILIENT WHEEL.

Application filed January 19, 1925. Serial No. 3,368.

*To all whom it may concern:*

Be it known that I, WILLIAM ALVA CARNS, a citizen of the United States, residing at Dunn Center, in the county of Dunn and State of North Dakota, have invented certain new and useful Improvements in Resilient Wheels, of which the following is a specification, reference being had therein to the accompanying drawing.

The present invention relates to resilient wheels, and aims to provide a novel and improved wheel construction using springs for resiliency in lieu of the well known pneumatic tires, so as to avoid tire trouble, such as punctures and blow-outs, incident to the use of pneumatic tires.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1:
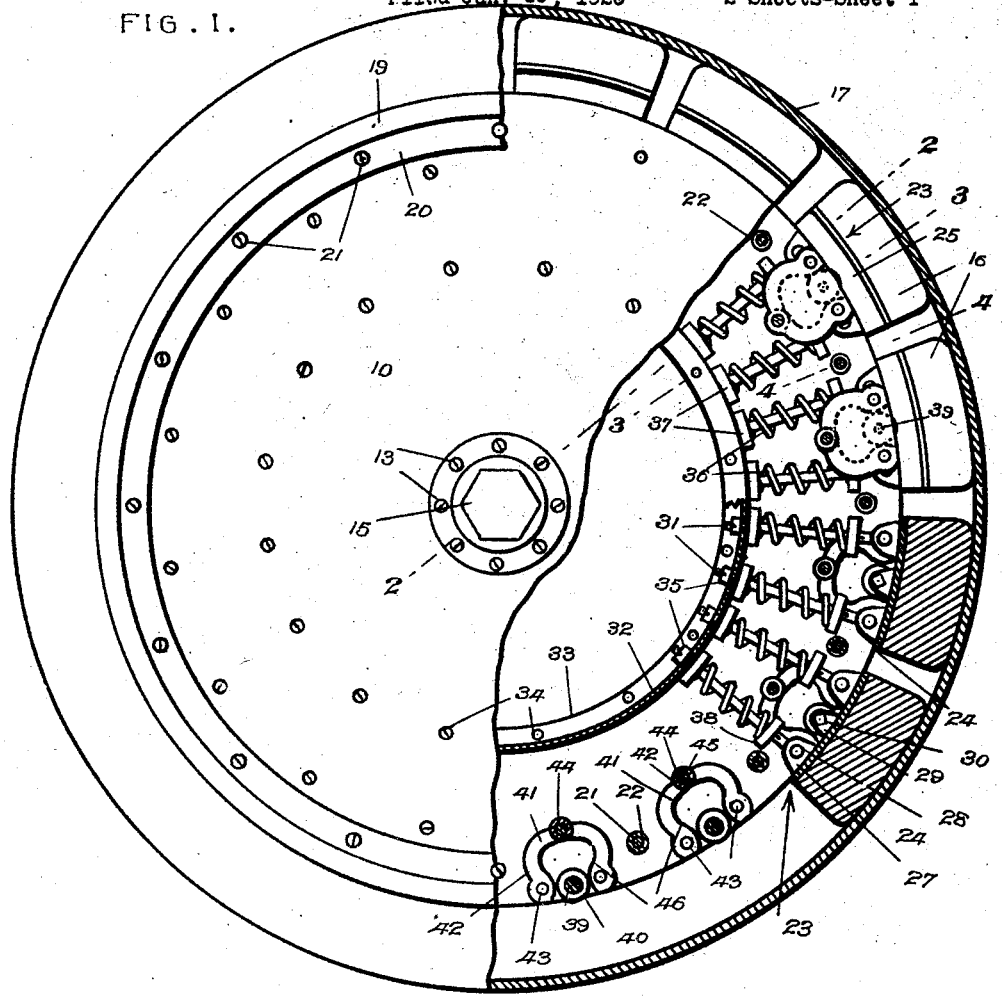

Figure 1 is a side elevation of the improved wheel, portions being broken away and shown in section.

Figs. 2, 3 and 4 are sectional views on the respective lines 2—2, 3—3 and 4—4 of Fig. 1, on an enlarged scale.

Figure 5:
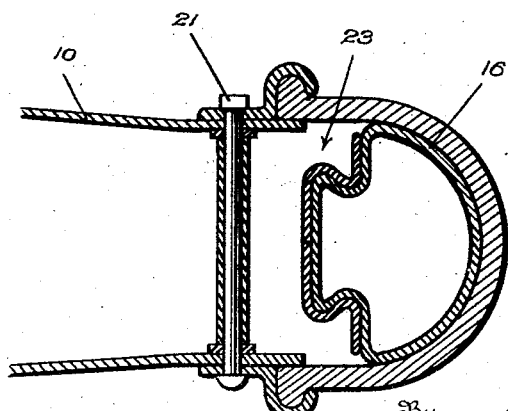

Fig. 5 is a sectional view similar to Fig. 4 showing a modification.

The body of the wheel comprises the sheet metal disks or plates 10 at the opposite sides which have central openings to accommodate the hub 11. Said hub may be of any suitable construction and has, at its opposite ends, the annular flanges or shoulders 12 against which the inner edge portions of the disks 10 bear. Screws 13 engage through the disks 10 and are screwthreaded into the flanges or abutments 12.

As shown in Fig. 2, the hub 11 is mounted on the spindle 14 of the axle by a ball or roller bearing, and a cap 15 is screw-threaded on the outer end of the hub to enclose the bearing.

The tire is composed of the longitudinally spaced segments or blocks 16 of rubber, wood, or other suitable material, over which is disposed a casing or shoe 17 of rubber, leather, or other suitable material. The shoe 17 has beads 18 at its edges engaging within the clincher flanges 19 of retainer rings 20 bearing against the outer sides of the disks 10 near the outer edges of said disks. The rings 20 are secured to the disks by means of transverse bolts 21 engaging through said rings and disks, and spacer sleeves 22 are preferably disposed on said bolts between the disks to prevent the disks from collapsing when the bolts 21 are tightened. When the shoe 17 is worn out, the bolts 21 are loosened, so that the beads 18 can be withdrawn from the flanges 19, thereby enabling said shoe to be replaced by a new one, or the old shoe can be repaired.

The segments 16 are carried by the metal carriers 23 which form bases for the segments. The carriers 23 are divided longitudinally between their edges into the opposite side sections 24, which are formed with the outwardly offset flanges 25 at their opposite side edges for receiving and holding the tongues 26 of the segments 16. Said tongues 26 are of dove-tail cross-section so as to lock between the flanges 25 when the sections 24 are secured together. The sections 24 of each carrier have inwardly extending ears 27 at their ends and inwardly extending ears 29 between their ends, and said ears are secured together by the bolts 28 and 30, respectively, engaging through said ears, to secure the sections 24 together on the tongue 26, thereby holding the segment assembled with the carrier.

The carriers 23 and segments 16 are yieldable radially inwardly, being moved outwardly by springs. Thus, radial rods 31 have their outer end portions pivotally engaging the bolts 28 between the ears 27, and the inner terminals of said rods slide loosely through apertures in a ring 32 located between the outer and inner edges of the disks 10. The ring 32 has flanges 33 at its edges against which the disks abut, and screws 34 engage through the disks 10 and into the flanges 32 for securing the ring and disks tightly together. Nuts 35 are screw-threaded on the inner terminals of the rods 31 to seat outwardly against the ring 32 so as to limit the outward movement of the segments 16, said nuts, after being adjusted, being secured to the rods by any suitable nut locks. Coiled springs 36 are disposed around the rods 31 with their inner ends seating against washers 37 that bear against the ring 32, while the outer ends of the springs 36 bear against collars 38 secured on the rods 31. Said springs being confined between the collars 38 and the ring 32 will move the rods 31 and segments 16 outwardly, and permit the segments to be forced inwardly toward the hub, for the cushioning action of the wheel and to absorb shocks.

In order to limit the longitudinal movement of the segments 16 circumferentially of the tire, the sections 24 of each carrier are provided between their ends with outstanding pintles 39 on which rollers 40 are mounted for turning movement. Said rollers 40 are disposed for movement within the recesses 41 of the plates 42 secured to the inner sides of the disks 10 at the outer edges of said disks. The plates 42 are secured to the disks by means of rivets 43 or other securing elements, and by means of transverse bolts 44 extending through the disks and plates, with spacer sleeves 45 on the bolts between said plates. The rollers 40 are movable inwardly in the recesses 41, and the opposite side walls of said recesses are curved, as at 46, around the corresponding bolts 28 as centers, to permit either end of each segment to swing inwardly about the axis of the bolt 28 at the opposite end of the segment. Thus, the segments can not only move inwardly bodily, but they can oscillate, inasmuch as either end of the segment can swing inwardly.

As shown in Fig. 5, the segments 16' can be hollow and may be composed of resilient sheet metal.

Having thus described the invention, what is claimed as new is:—

1. A wheel comprising a body, a tire composed of segments, rods slidable in the body and pivotally connected with the segments near the ends of the segments, spring means associated with said rods for moving the segments outwardly, and interengaging members carried by the body and segments between the ends of the segments to limit the longitudinal movement of the segments relatively to the body, said members of the body having portions curved about the corresponding pivots between the rods and segments and along which the members of the segments are movable when the segments swing inwardly about said pivots.

2. A wheel comprising a body, a tire composed of segments, rods slidable in the body, pivots connecting said rods and segments near the ends of said segments, spring means associated with said rods for moving the rods and segments outwardly, plates carried by the body and having recesses, and rollers carried by the segments between their ends and working in said recesses to limit the longitudinal movement of the segments relatively to the body, said recesses having their side walls curved about the corresponding pivots as centers for the inward swinging movement of the ends of the segments.

In testimony whereof I hereunto affix my signature.

WILLIAM ALVA CARNS.